United States Patent [19]

Williams

[11] Patent Number: 5,414,808
[45] Date of Patent: May 9, 1995

[54] METHOD FOR ACCESSING AND MANIPULATING LIBRARY VIDEO SEGMENTS

[75] Inventor: Marvin L. Williams, Lewisville, Tex.

[73] Assignee: International Business Machines Corporation, Armonk, N.Y.

[21] Appl. No.: 998,352

[22] Filed: Dec. 30, 1992

[51] Int. Cl.$^6$ .............................................. G06F 17/30
[52] U.S. Cl. ................................... 395/154; 395/600; 364/DIG. 1; 364/283.3
[58] Field of Search ................ 395/152, 153, 154, 155, 395/156, 159, 161, 600; 345/122

[56] References Cited

U.S. PATENT DOCUMENTS 5,101,364  3/1992  Davenport et al. ................. 395/152
5,109,482  4/1992  Bohrman ............................ 395/154

OTHER PUBLICATIONS

IBM Technical Disclosure Bulletin, vol. 34, No. 8, Jan. 1992, A. Martinez et al, "Dynamic Time Bar with Editing Capabilities", pp. 384–385.

IBM Technical Disclosure Bulletin, vol. 10a, Mar. 1991, Bonsall et al, "Collection Index for Temporal Data Descriptions", p. 347.

IBM Technical Disclosure Bulletin, vol. 10a, Mar. 1991, Bonsall et al, "Sequence Index for Temporal Data Descriptions", pp. 344–345.

IBM Technical Disclosure Bulletin, vol. 10a, Mar. 1991, de Nijs, "Correlating Audio and Moving-Image Tracks", pp. 295–296.

Primary Examiner—Thomas G. Black
Assistant Examiner—John C. Loomis
Attorney, Agent, or Firm—Whitham, Curtis, Whitham & McGinn; Norman L. Gundel

[57] ABSTRACT

A system for manipulation of isochonous data provides for definition of frames within the string of isochronous data, if necessary, and then allows selection of frames of data from items of isochronous data to define segments therein. retrieve, copy and delete operations are facilitated by the use of the frames of data as arguments in the presentation of commands to an operator. Criteria such as time and frame numbers and names may be used to define segments and express Boolean logic operations to be carried out during these operations and to define, during editing, of the particular frames to be reproduced. By doing so, only the frames of interest are retrieved from or copied to memory to reduce memory operation and data transmission overhead.

15 Claims, 6 Drawing Sheets

METHOD FOR ACCESSING AND MANIPULATING LIBRARY VIDEO SEGMENTS

BACKGROUND OF THE INVENTION

1. Field of the Invention

The present invention generally relates to editing of isochronous data and, more particularly, to the manipulation of streams of isochronous data for editing, such as in the production of an audio-visual presentation.

2. Description of the Prior Art

The production of audio-visual presentations generally involves the editing of film, tape or other media containing time-ordered data. Such data is generally not only time ordered but must be presented at a particular rate and is therefore generically referred to as isochronous data. Depending on the manner of rendering such data into a readily perceived form, synchronization may also be required.

With early media containing isochronous data such as audio tape or motion picture film, editing was generally accomplished by using an apparatus which allowed the storage medium to be slowly moved in either direction while a desired position thereon was found, such as by listening for a particular event recorded on tape or locating a desired frame in a continuous piece of motion picture film. When the desired position was found, the medium could be physically cut, and, if desired, a cut portion of the medium attached to another piece of the medium in order to be reproduced contiguously therewith. The piece of film or tape cut would preserve the order and format of the data therein.

Such cutting of a storage medium generally requires that both a beginning and an ending point to be located where desired cuts are to be made. With continuous storage media, there was generally no practical alternative to scanning through the intervening information. In such a case, however, only one copy of the information was usually involved and the distance between cuts was often small. However, in a case where the same sequence of information or portions thereof was to be repeated in a particular presentation, several copies or prints were first made and it was necessary to locate desired positions for cuts on each copy.

With the development of digital storage of both audio and video data, computerized manipulation of portions of the data are now possible, such as for copying and editing. Further, manipulation of other forms of isochronous data such as well-logging data or medical telemetry has become possible since physical manipulation of the storage medium is no longer required. However, the techniques for locating particular portions of isochronous data has tended to follow prior editing techniques requiring the operator to inspect all or a large fraction of data to locate desired positions for each edit. Clearly, this is time-consuming and burdensome to the operator, particularly where particular locations must be found numerous times.

Data search systems are also known for rapidly locating particular pieces of information which may be contained in a more or less massive data base. For example, familiar spelling correction applications search a library of character combinations to confirm correct spelling. Searches for words in a body of text, possibly containing thousands of separate and independent documents involves a similar process. However, in either case, and particularly the latter in which a block of surrounding text is also presented when a search has successfully located a term, there is no facility for precisely determining and/or marking the location where the term is found. Further, such search systems are completely inflexible in regard to the amount of data presented or defining a range of data by the search result. For example, if the search system provides for display of a block of text surrounding a successful search result, the extent of that block of text is generally fixed. Further, there is no facility of defining a range of data based upon results of different searches but only documents or pages in which the search was successful. For this latter reason, currently available data base query applications are particularly unsuitable for isochronous data manipulation even though extraction and titling of single video frames is well-known in the art.

Object-oriented operator interfaces have recently become familiar to most users of computers. In these interfaces, operations and/or items of data are represented by graphical images known in the art as icons. Using a mouse or other cursor position control device such as a trackball or light pen, an operator may select an icon (e.g. by "clicking" a button of the mouse while the cursor is positioned at an icon) and positionally manipulate it (e.g. dragging the cursor or icon by moving the mouse while depressing a mouse button) through the display in a manner which causes the one or more commands to be generated and executed by a computer. For example, selecting an icon which represented a particular item of electronic mail or a file and dragging that icon to the location of another icon which may resemble a waste-basket will cause the item to be erased. Dragging the same icon which may resemble a safe or a floppy disk may cause storage of the item and specify the location in storage. Such interfaces have been found to be fast, user friendly and generally result in lowered incidence of operator error. However, a fixed library of icons is usually provided which limits the number of objects which can be represented. Further, the object or operation which any icon can represent must exist as an entity or item within the system and is not generally user-definable. That is, there is a fixed relationship between each icon producible by the object oriented interface and a particular one of a predetermined and limited number of items which is represented thereby although the content of the item is freely changeable. However, since the format of the item content must be fixed, it is difficult to apply object oriented user interfaces to isochronous data, largely because there is no regular format of isochronous data and an "item" thereof is usually limited to an entire file or certain predefined blocks thereof.

SUMMARY OF THE INVENTION

It is therefore an object of the present invention to provide an arrangement incorporating a structured video language for defining and accessing segments of isochronous digital data from a digital data library.

It is another object of the invention to provide for location of desired positions in a stream of isochronous data and to control access to segments of isochronous data repeatably in connection therewith.

It is a further object of the invention to provide an object oriented user interface for manipulation of isochronous data.

In order to accomplish these and other objects of the invention, a method of manipulating isochronous digital data is provided including the steps of retrieving an item of isochronous data from a library storage means, transmitting at least a portion of the isochronous data to a terminal of a data processing system, reproducing at least a frame of the portion of isochronous data utilizing the terminal, selecting a frame of the portion of isochronous data, searching the isochronous data for correspondence with the selected frame of the portion of isochronous data, and retrieving at least one frame of isochronous data responsive to results of the searching step.

In accordance with another aspect of the invention, in the course of the above method, a representation of a segment of isochronous data is inserted as arguments in data processing commands presented to an operator.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
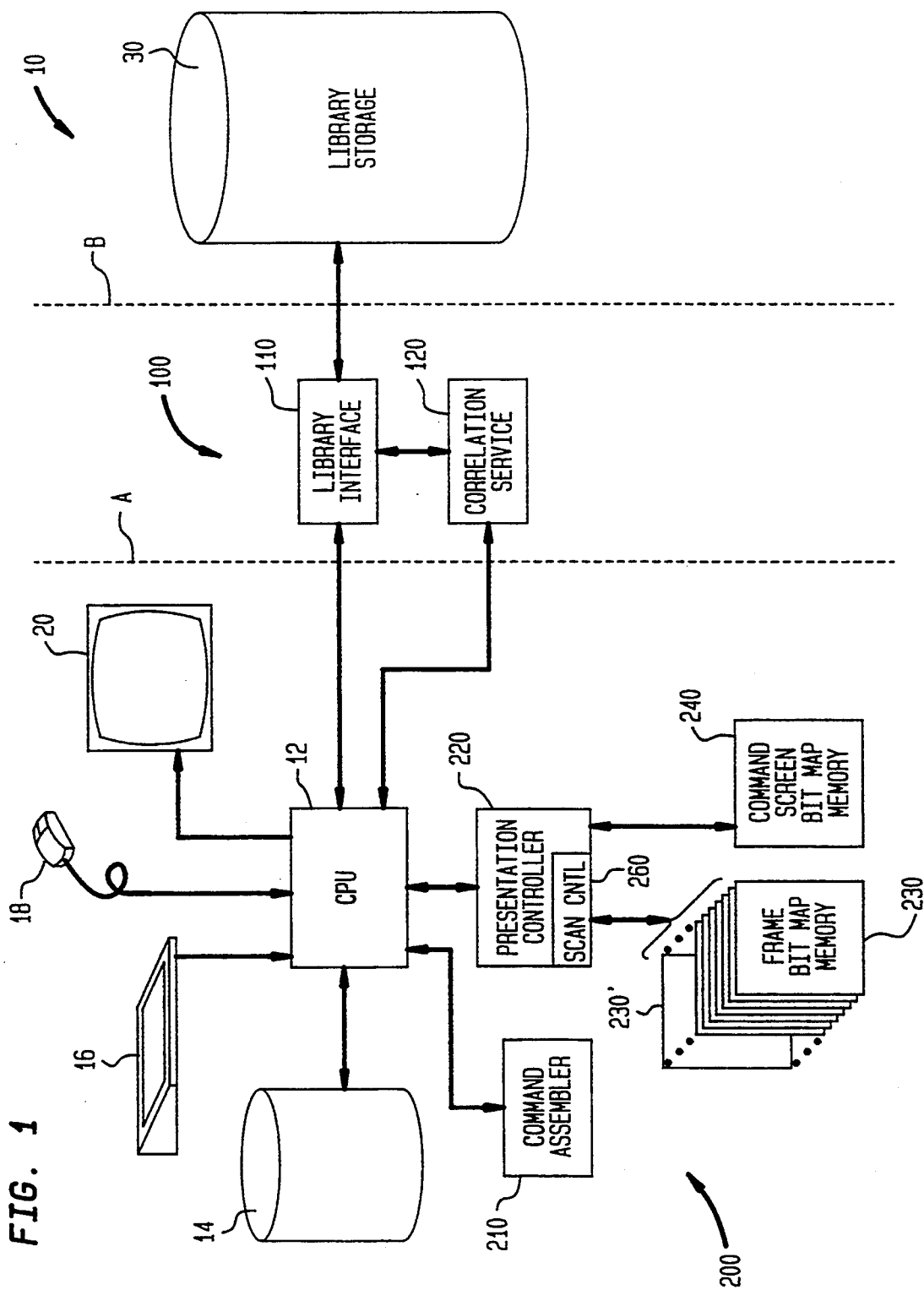
FIG. 1 is a schematic illustration of the organization of a data processing system incorporating the invention.

Referring now to the drawings, and more particularly to FIG. 1, there is shown, in schematic representation, a data processing system 10 incorporating the invention. Conventional elements of the system include a central processing unit 12 Which includes high speed memory, a local storage device 14 such as a hard disk, input devices such as keyboard 16 and mouse or trackball 18 and a data reproduction device capable of reproducing isochronous data in a form which is perceptible by the senses of an operator such as a loudspeaker or the CRT display illustrated or both. A television set 20 is illustrated as symbolic of both audio and video reproduction. One or more mass storage devices 30 are also provided in the system which is, itself, conventional, although the interface thereto is considered to be within the scope of the invention.

The invention includes two basic sections: the interface 100 to the mass storage, including the library interface 110 and correlation service 120, and the structure 200 supporting the interface to the operator, including a presentation control 210, a command parser 220, a command screen memory 240 and a memory 230 capable of storing a plurality of groups of isochronous data which will hereinafter be referred to as "frames" such as a frame of video image, although any segment (e.g. window) of a bit stream having a predetermined constant but arbitrary length could be used. As an aside, frames of a video presentation provide a convenient example for explanation of the invention since they are discrete and non-overlapping segments of a bit stream. However, with only slight complication, the invention may also be practiced on potentially overlapping windows in a continuous bit stream of isochronous data, such as would be presented by audio data. Conversely, frames may also be used exclusively in the practice of the invention since it provides significant simplification when audio is associated with video frames, as is often the case in audio-visual media.

Library 30, which is of a known type capable of storing isochronous data, stores and accesses that data by files. Each file is represented by a binary bit stream representing, say, video pixel bits or digitized audio signals. Each of these files will also typically have signals included therein which function as synchronization signals. For example, a video signal will contain a signal which marks the separation between frames. However, the existence of these embedded signals is not necessary to the practice of the invention since they may be added to the signal as it is retrieved. For example, frame separation identifying signals may exist in the library storage as frame numbers or merely an embedded synchronization signal or pulse. In the latter case, Upon retrieval from the library storage 30, each such pulse detected may have a flag and an identifying number, sequentially generated, substituted for the digital bits representing the pulse. If such synchronization signals are not included, it follows that a standard must exist in number of samples per second or the like and therefore a sequentially generated number can be embedded by counting the samples of the signal, as retrieved, and inserting a number with a flag identifying the number as a synchronization signal, in a manner which will be evident to those skilled in the art in view of this disclosure.

Figure 2:
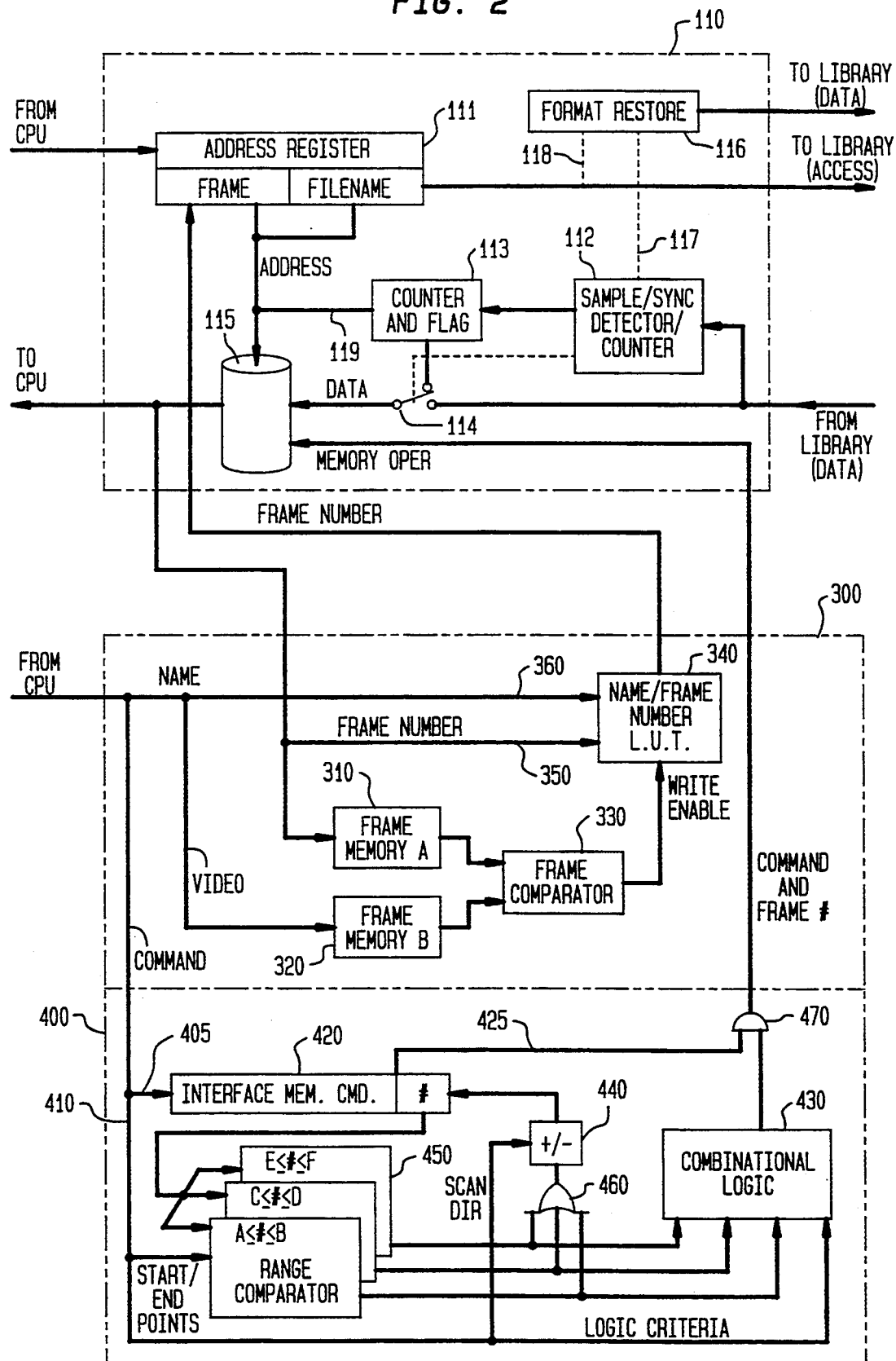
FIG. 2 is a more detailed schematic diagram of the interface 100 of FIG. 1, FIGS. 3 and 4 are exemplary screens produced in accordance with the practice of the invention.

For example, in a preferred form of interface 100, shown in FIG. 2, the library interface 110 includes a register 111 which can receive and store addresses including a filename and a frame identifier. The filename is initially used to retrieve isochronous or other data from the library. (It is assumed for simplicity at this point that the library store 30 does not support partial reads and writes of files. That is, read and write access must perform a read or write only of a file in its entirety. If partial reads or writes are, in fact, supported by library store 30, some of the structure of the library interface 110, described below may be present therein and may be directly controlled by the remainder of the combination of the invention, as will be described below.)

If the data accessed is not isochronous, of course, the enhancements provided by the invention and the data are not necessary and the data may be returned from the library to the CPU over a direct signal path (not shown). A determination that data is isochronous can be done in many ways due to the nature of isochronous data, itself. For example, either synchronization signals or information concerning sampling rate (e.g. provided in a header field of the data) are virtually necessary to assure data integrity and either can be detected to determine that the file contains isochronous data. Often, conventions in filenames assigned to isochronous data are employed, as well. The detection of any of these features is preferably done at detector/counter 112.

If the data is isochronous, it is preferable in the practice of the invention to ensure that signals which will serve as frame markers (e.g. synchronization signals) be embedded in the data and uniquely identified. These signals may already be present in the data as retrieved from the library and, if so, that feature of the data will also be detected at detector/counter 112 and the data from the library may be directly passed to interface store 115 through switch 114. If these signals are not present at all, a counter in detector/counter 112 is activated to count the number of samples and to generate a signal each time a predetermined count (which is preferably related to the playback rate specification of the file) is reached. This signal increments counter 113 to generate a unique number for the frame marker. If desired, one or more flag bits may be added to identify the output of counter 113 as a frame marker and the resulting signal is inserted in the bit stream at switch 114 under control of the sample counter in detector/counter 112. If synchronization signals or other frame markers are present in the data as retrieved from the library store 30 but not uniquely identified, the operation is similar except that it is not necessary to count samples but merely generate and embed a frame identifying number in the data for each occurrence of a synchronization signal.

Each time a number is generated, it is also provided to the frame address portion of address register 111 to provide a corresponding address in the interface memory 115 as the data is stored, in order to control the storage location in conjunction with the filename. Thus, the data in the interface memory 115 will be the same as the data in a file in library storage except that the presence of unique frame identifiers is guaranteed. This data may now be accessed from the interface 100 in the same manner as it might have been accessed from the library store 30. However, the access enhancements in accordance with the invention may now be readily applied thereto. A plurality of isochronous data files may be stored at the interface memory 115 at any given time. As a perfecting feature of the invention but not necessary to the operation thereof, a format restoring circuit 116 can be provided to perform the inverse operation of that done at detector counter 112 and counter 113 when data is written to the library store 30. The precise function to be performed is preferably associated with the filename in a memory register within the format restore device from information provided over connections depicted by dashed lines 117 and 118. This information is retained for each filename accessed and currently contained in the interface store 115. However, this is not necessarily desirable in systems where the invention is employed since unique frame identifiers must be embedded in the data each time the data is accessed, requiring some degree of processing overhead. Nevertheless, if the data is to be accessed and reproduced by apparatus having only the capacity to handled samples at a predetermined rate, it would be necessary to remove the frame identifier signals when the file is again written to the library store 30. Also, when a new object is stored by the copy operation, it is desirable to provide a new set of consecutive frame numbers which will be done automatically if frame numbers are removed when the object is copied.

It should be noted that it is considered preferable in the practice of the invention to physically incorporate the interface 100, including the library interface 110 and correlation service 120 in the resource containing the library store 30 as indicated by dashed line A in FIG. 1 for the simple reasons of avoiding duplication of structure compared to implementing the invention with the interface 100 associated with each of a plurality of terminals or network nodes, as symbolically indicated by dashed line B. Also, as indicated above, if the library store 30 supports partial reads and writes of files, some of the structure of the library interface 110 will already be present and can be exploited in the practice of the invention.

The correlation service 120, in accordance with the invention, has two basic functional elements. A search service element 300 is provided to allow correlation of a frame selected by the operator through CPU 12 with a position in a contextual bit stream comprising a file stored in interface memory 115 on the basis of either an arbitrary name assigned by the user/operator or by the actual frame data content. This feature of the invention has several advantages which will become evident from the description of the operation of the invention hereinafter.

The correlation service further preferably includes a memory access control section 400 which allows the file to be limited to only selected portions before it is transmitted to CPU 12. This feature has many operational advantages within the terminal section 200 of the combination of the invention and reduces much computing and memory management overhead. Of similar importance, if the interface 100 is physically articulated with the resource including library store 30 in a network environment, network traffic is substantially reduced, even in comparison with library stage devices which support partial reads and writes.

Since the first time data is retrieved into the CPU 12, the operator will not have made a selection of any particular frame therein for editing or other operations and therefore search service section 300 preferably includes two frame memories 310, 320, each capable of holding the digital information for a single frame, and a frame comparator 330 which basically performs an AND function on corresponding bits (e.g. pixels) in each frame memory. When coincidence is found between the binary bit stream from the CPU and the bit stream accessed from interface memory 115, a write operation is enabled in a name/frame number look up table (LUT) 340. If no name is specified by the operator on line 360, a default name address is provided so that the current frame number, supplied from the library interface 110 with the frame data over line 350 will be written to the default address and read back to the library interface which will then return the frame data to the CPU 12 as confirmation. Otherwise, any arbitrary name specified by an operator will be associated with a frame number and the frame may thereafter be accessed by the name specified.

Before proceeding to a discussion of the memory access control section 400, a brief discussion of the command assembler 210 and presentation controller 220 of FIG. 1 will be provided. The principles of presentation controllers are well-understood in the display art. Their basic function is to provide one or more predefined presentation screens such as that shown in FIG. 3 or 4 and which may be stored in command screen bit map memory 240 and, upon reading a screen display from this bit map, assembling other display information therewith. I the preferred embodiment, windows reproducing video data are provided by selective storage to frame bit maps in the frame bit map memory 230 which will also preferably include a dedicated bit map for the current image information being supplied by the interface. However, icons which may be supplemented by, for example, audio tones or reproduction of a frame defined in isochronous data containing audio information can also be used. Therefore, reference hereinafter which are specific to video presentation are made in the interest of clarity, particularly in regard to the preferred embodiment, and not to be considered as limiting the invention thereto. The presentation controller of the present invention is similar to those known in the art except that it also contains a scan direction control to reorder the bits within a frame in some forms of data in order to always present a true reproduction of the frame even when the data bits within a data stream of isochronous data are scanned in a reverse direction as may be done in the CPU 12 or caused by particular operations in the interface 100 which will be described below.

Command assembler 210 is largely constituted by a command parser which is, itself well-known in the art. The requirement that commands to a data processing system must be in a rigidly fixed syntax or format has caused parsers to be used to assemble arguments which can be specified or retrieved during other processing steps to be assembled with a specified command to which the data processing system will respond. Parsers can also be used to substitute one command in machine or program language for another which is considered more user-friendly and can thus be used to make the machine or program language transparent to the user. In this case, the parser preferably includes structure for resolving and processing Boolean and other (e.g. time) constraints before submission to the library service. This type of structure, itself, is also well-understood in the art and implementation with a parser will be evident to those skilled in the data processing art.

Figure 3:
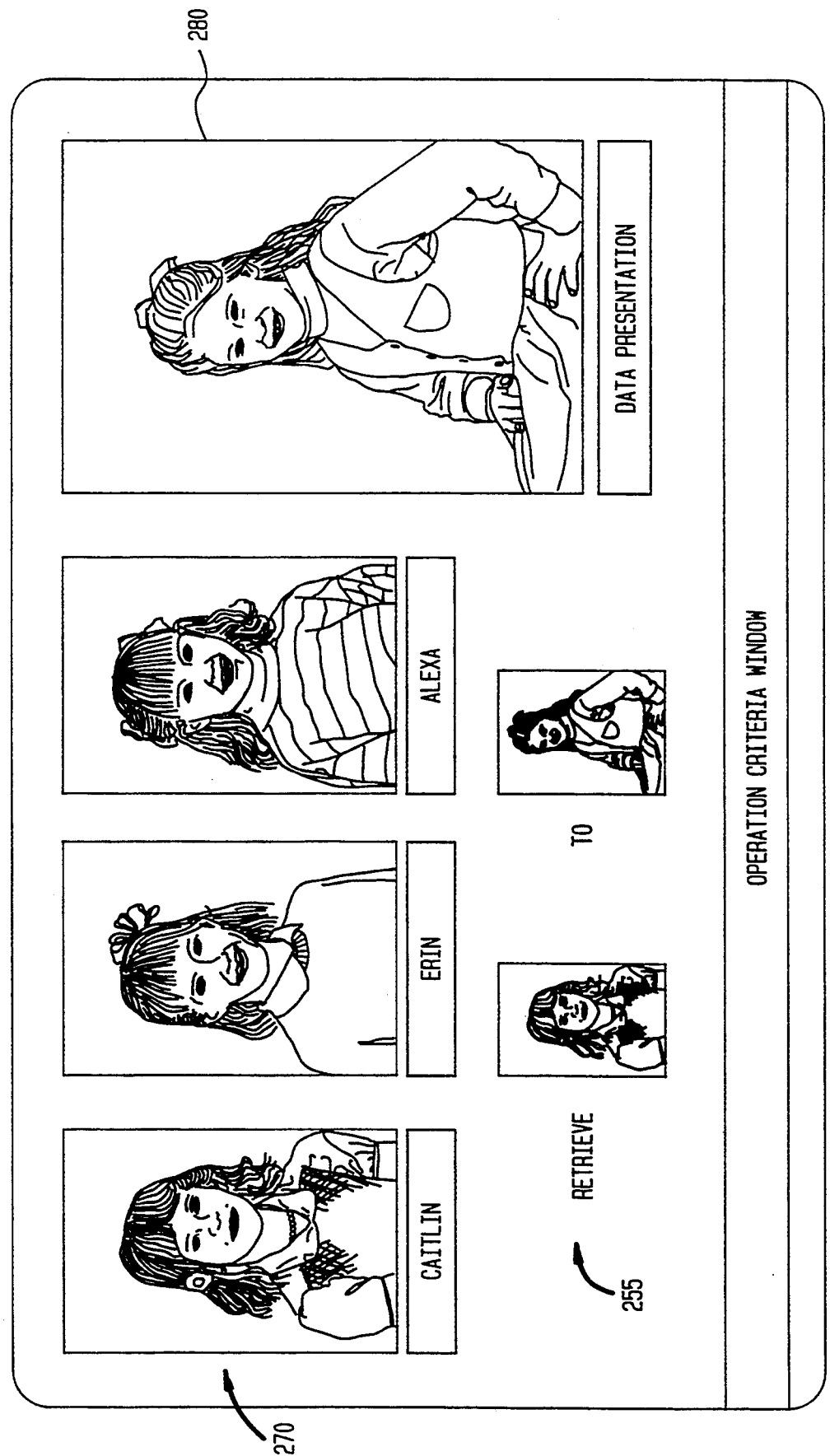
Figure 4:
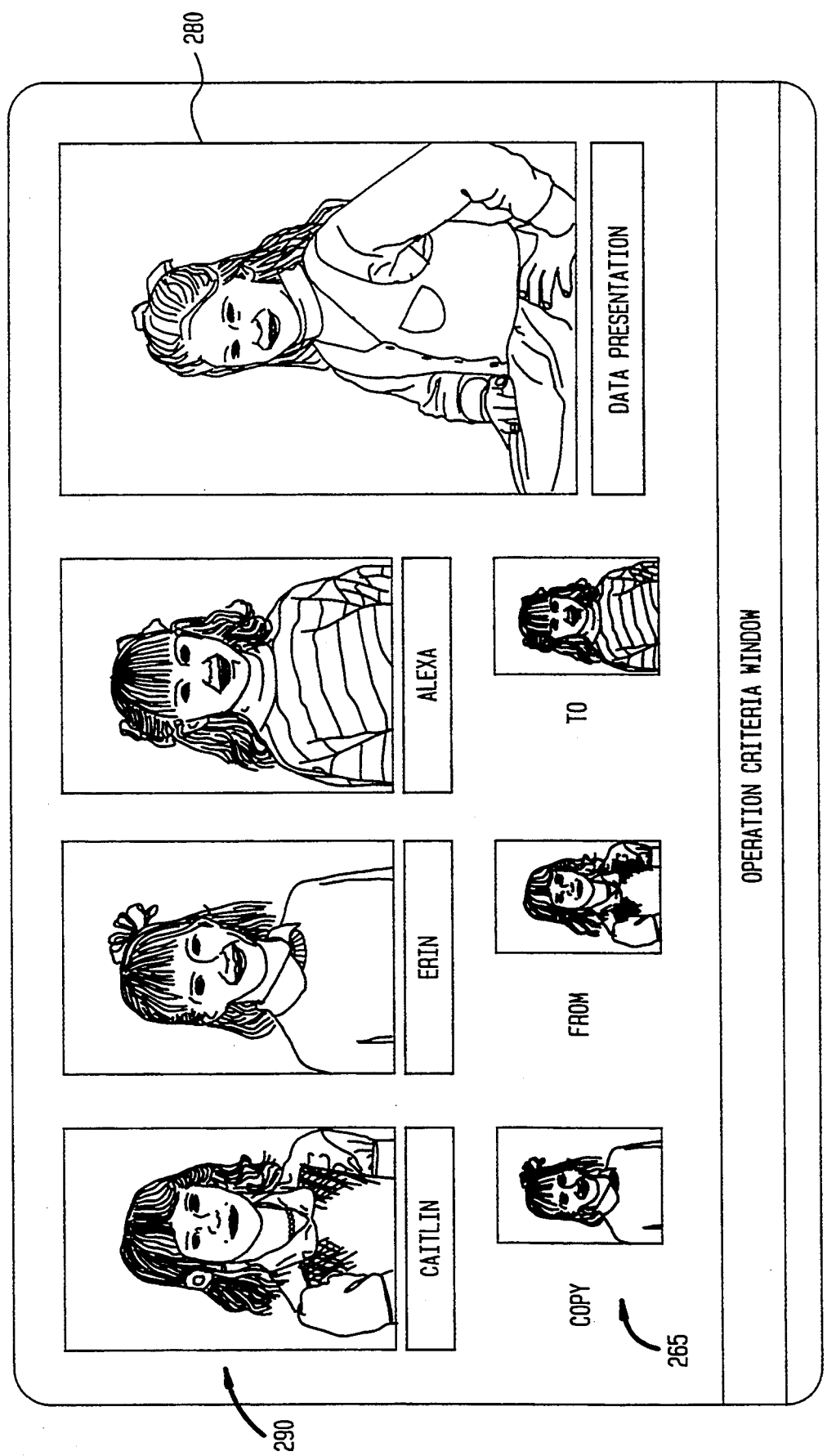

The user or operator interface will now be described with reference to FIGS. 3 and 4 which may be called by different operations if different screens are provided in the command screen map memory. Alternatively, a single generalized screen may be provided. It is somewhat preferred to provide separate screens for each operation since the syntax of commands may vary. For example, the command line 255 of FIG. 3 requires two arguments (e.g. two frames) while the command line 265 of FIG. 4 requires three arguments (e.g. objects). Therefore, separate screens specific to each command can contain and display the syntax of the command to the operator which reduces operator error and simplifies parser operation. In the preferred embodiment of the invention, also, it has been found that most desired data manipulations can be accomplished with only three commands (retrieve, copy and delete) and, therefore, a large memory is not required for storage of separate bit maps for all of these commands.

To demonstrate how the invention supports an object-oriented user interface for manipulation of isochronous data, the retrieve operation and FIG. 3 will now be explained at the level of the terminal and with reference to the retrieve command. Operation of the overall invention including the user interface will be deferred until the discussion of FIGS. 5-7, below.

When the user specifies a particular file of isochronous data, for example, by entry on keyboard 16, the filename is sent to the library interface 110 by the CPU 12. This file is then retrieved from library storage 30 and stored in the interface store 115. In this respect, the interface storage functions much in the manner of a cache and various techniques, such as contention resolution, are applicable thereto. This retrieval is preferably done from the end to the start of the file so that the address at 119 of FIG. 2 will be the first frame of the retrieved file and therefore the first frame of the isochronous data will be returned to the CPU. Of course, many other and simple ways of returning the address to the first frame or any other predetermined frame of the presentation will be readily apparent to those skilled in the art and the direction of retrieval of the isochronous data stream is not particularly important to the invention. At the same time the retrieval of isochronous data is being retrieved from memory, the Retrieve command also causes the retrieval of the Retrieve command screen from the command screen bit map memory 240. The returned image is then displayed to the operator, preferably in a window dedicated to display of the data presentation. Then, by manipulation of the mouse 18 or cursor keys of the keyboard 16, frames of the video presentation may be iterated through or the presentation played at normal or accelerated speed until a region of the isochronous data containing a desired frame is reached. As each frame is called from the library interface during this process (which may be done asynchronously to accommodate network constraints, if any) it is temporarily stored in the random access memory (RAM) of the CPU 12 on a first in-first out (FIFO basis so that a short segment of the presentation can be accessed at high speed. Incidentally the frame bit map memory is also preferably implemented in RAM and a dedicated portion of the frame bit map memory can be used to store the frames of this region of the presentation. When the region of a desired location is reached, the operator can command the termination of playback and control a slow scan through frames of the bit stream by use of cursor keys of the keyboard or the mouse. Since the isochronous data is in the form of a continuous bit stream and data must be read and displayed at high bit rates, it is considered to be more convenient to merely increment or decrement addresses in the RAM without regard to frames. Therefore, each time a frame number is encountered in the bit stream, the currently displayed frame is changed. During reverse scanning through the bit stream, the order in which data is stored into a plane 230' of the frame bit map memory (embodied in RAM) must be reversed during at least one of storage and readout for display in a window of the command screen in order to avoid reversing the displayed image.

Cessation of scanning is sensed to cause a return of the video bits of the current frame to frame memory B 320 of the correlation service which will also receive video bits of the current frame transferred from the interface store 115. As a separate subroutine of the interface, it is preferred to provide for automatic forward and reverse scanning of several frames in the interface memory until a match is found. This operation assures that access in the CPU 12 and the interface 100 remain synchronized.

Returning to a discussion of the interface at the terminal level, the operator, once the desired frame is displayed in the presentation window, the operator may select it preferably by "clicking" a button of the mouse 18 after placing a cursor on the image window and, if desired, associate a name with the frame number. This action causes storage of the video image in another plane of the frame bit map memory 230 from which it effectively becomes an icon and may be dragged across the screen by manipulation of the mouse in a manner well-understood in the art. If the icon thus generated is moved to a window in the menu region 270 of the display and dropped into it, the icon becomes the name of the segment of the presentation being defined by the Retrieve operation and the object to which it will then refer. If the cursor is then moved back to the presentation area and again "clicked" another icon is generated (or, alternatively, it could be retained or spawned from the original selection after being placed in the menu)

and can be further dragged to the command line and entered at a desired location thereof.

While this action is taking place, the CPU is also recording the actions done in regard to the locations and the icons and making appropriate communications to the command assembler 210 in a manner well-understood in object oriented interfaces, referred to above. Thus when the operator continues scanning or playback in either the forward or reverse directions to make selections of other frames, a memory control command is being simultaneously assembled. It should be noted that this interface also provides substantial flexibility to the operator since a selected frame can be named without becoming the name of an object presented in the menu. This also avoids a need for the icon size in the menu to be reduced below proportions which provide good recognition by the operator. Editing within the object can then be specified by names and symbols representing Boolean or time operators within the command line (e.g. "Caitlin to Cleo NOT Julie to Ed", "Caitlin+10 minutes" or, with objects which define segment of isochronous data with plural frames, "Caitlin OR Alexa or Erin") to define the object represented by the icon.

Similarly, these objects, once assembled, by the retrieve operation can be assembled by copying, in whole or in part from a file or an object so defined by extraction of frames or objects from the menu or both. Further editing may be accomplished by deleting defined ranges or objects for other objects.

Returning the interface level, the command which is assembled at the command assembler 210 is executed by generating a plurality of commands to the interface memory 115 at the interface. This feature further greatly reduces network traffic since only a single command is issued to the interface which then responds with only the precise frames or ranges of frames specified. As the command is sent to the interface, the command is initially stored in register 420 over connection 405 with an initial frame number determined and parsed into the command when the object was selected (e.g. from the menu). The logic criteria from the command are forwarded to combinatorial logic element 430 and the scan direction, determined from the relative values of the start and end frames of the object, is set into increment/decrement element 440. Start and end point criteria are also set into range comparator array 450. Simple range comparators may be used since each object within the main object upon which selection operations have been performed is a group of consecutive values. (Gaps between groups of values would not appear in the main object since the copy operation creates a new object in the interface with a new consecutive set of frame numbers and the delete operation can be handled by BUT NOT combinatorial logic until copied to library store 30.

Then, when the command in register 420 is executed, at least one comparator in the range comparator array 450 will produce a successful comparison. In response, the frame number is incremented at 440 and the command repeated. This loop will continue as long as any comparator produces a positive comparison, as detected by OR logic 460 and a command and frame number will be issued on each iteration. The individual positive comparisons are filtered through combinatorial logic element 430 and the result used to gate the command and frame number on line 425 when the logic criteria specified by the operator are satisfied. In this fashion only those individual frames which are of interest to the operator are retrieved from interface store 115 are transmitted to CPU 12. It should also be noted that this arrangement also allows a range of frame numbers which may be modified at will to be treated as an object by an object oriented user interface at the terminal.

The sequence of operations in accordance with the invention will now be discussed with reference to FIGS. 5 and 6. It will be assumed for invoking a start of the operations of FIG. 5 that a command has been issued to retrieve a file from library storage 30. This operation is accomplished at the level of interface 100 by the operations of FIG. 6 which, in a preferred software embodiment would be run as a subroutine in this instance, indicated by the dashed lines and circles at A and B of FIG. 5. The details of this subroutine will be discussed below with reference to FIG. 6. Assuming a successful retrieve operation the frame numbers generated in the manner discussed above in regard to the library interface 110, the frame numbers are stored with the retrieved data at step 520. Then data is retrieved from the interface memory 115 and transferred to CPU 12 for display during playback or scanning under operator control at step 530 which should be considered as an operational mode which is terminated upon frame selection, detected at 541. While the system is in this operational mode, looping at 541, the scan direction is continuously monitored and frame data is transposed and frame number decremented during reverse scan (e.g. during reverse scan, any frame number encountered will correspond to a preceding frame, requiring adjustment of that frame number by a bias amount to find the frame number corresponding to the data currently being retrieved).

When loop 541 is exited by a frame selection, the operator is able to associate a name with a frame number as was discussed above in regard to search service section 300 of the correlation service 120. If a name is selected, it will be associated with a frame number by storage in LUT 340 of FIG. 2. If the selected frame is then placed in the command line of the screen, as discussed above with reference to FIGS. 3 and 4, a corresponding argument is placed in the command assembler and parsed with the command being assembled at step 570. If the selected frame is placed in the menu, it is assumed that some editing may be desired and the operator is prompted to enter time (e.g. segment duration) or Boolean criteria which causes addition of the criteria to the command being assembled in command assembler 210. Then the parser checks the command, especially for allowable nesting of objects and lack of ambiguity (e.g. a frame being added by one specified criteria and deleted or excluded by another at the same location in the edited presentation) by checking of start and end points.

Once the command is resolved for the added object selection, function and or criteria, a search of the data in the file at the interface memory 115 is made an the result returned at step 610. It should be noted that the procedure of FIG. 5 must be executed once in order to define an object having at least one desired frame. Therefore, this is referred to as a search result, as distinguished from but generic to a query result which will result from the execution of a command assembled by command assembler 210. The search request is checked at 620 to determine is any time duration parameter exists within the definition of the selected object. If so, the data is checked to determine the rate at which the data is to be produced at step 621. It is possible, particularly if the library store 30 supports partial reads, that the segment specified by the selected object may not include such information, in which case a default query to obtain the entire file or a segment including such data will be executed. If such information is present, however, a computation of the number of frames which corresponds to the time parameter is performed and the result substituted in the definition of the object. Then a further step of building the query request is done if the query command is not complete to the operator's satisfaction by branching to C of FIG. 5 at step 630. If the query was complete or if a default retrieve operation is performed, the result is retrieved at 640. Success of the retrieve operation is determined at 650. Failure of the retrieve, as might occur, for example, if an object in one file was searched against another file to determine duplication of the frame therein, is reported at step 670. The data is then checked or, preferably, the result of step 621 recalled at 651 to carry out a preplay of the data to obtain locations at which frame numbers should be applied at step 652. Once those locations have been determined by counter/detector 112, unique frame identifiers are generated at 113 and insert at 114 or equivalent devices collectively indicated by step 660. The returned isochronous data is then available to. the terminal 200 and the user as described above. The user may then re-enter the procedure of FIG. 5 at step 520 (the completion of step 510).

Figure 5:
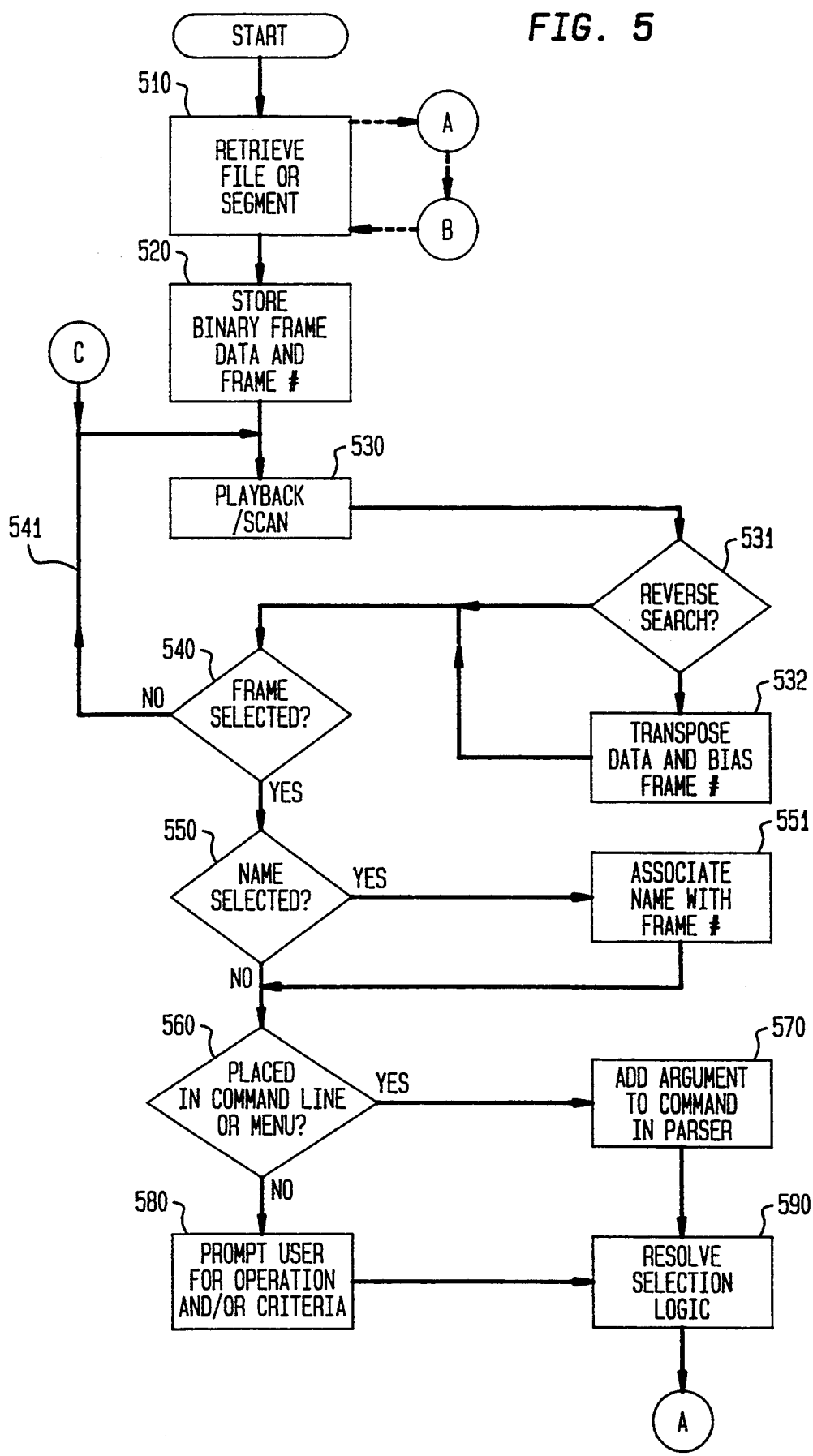
FIGS. 5 and 6 are flow charts indicating the operation of the invention.
Figure 6:
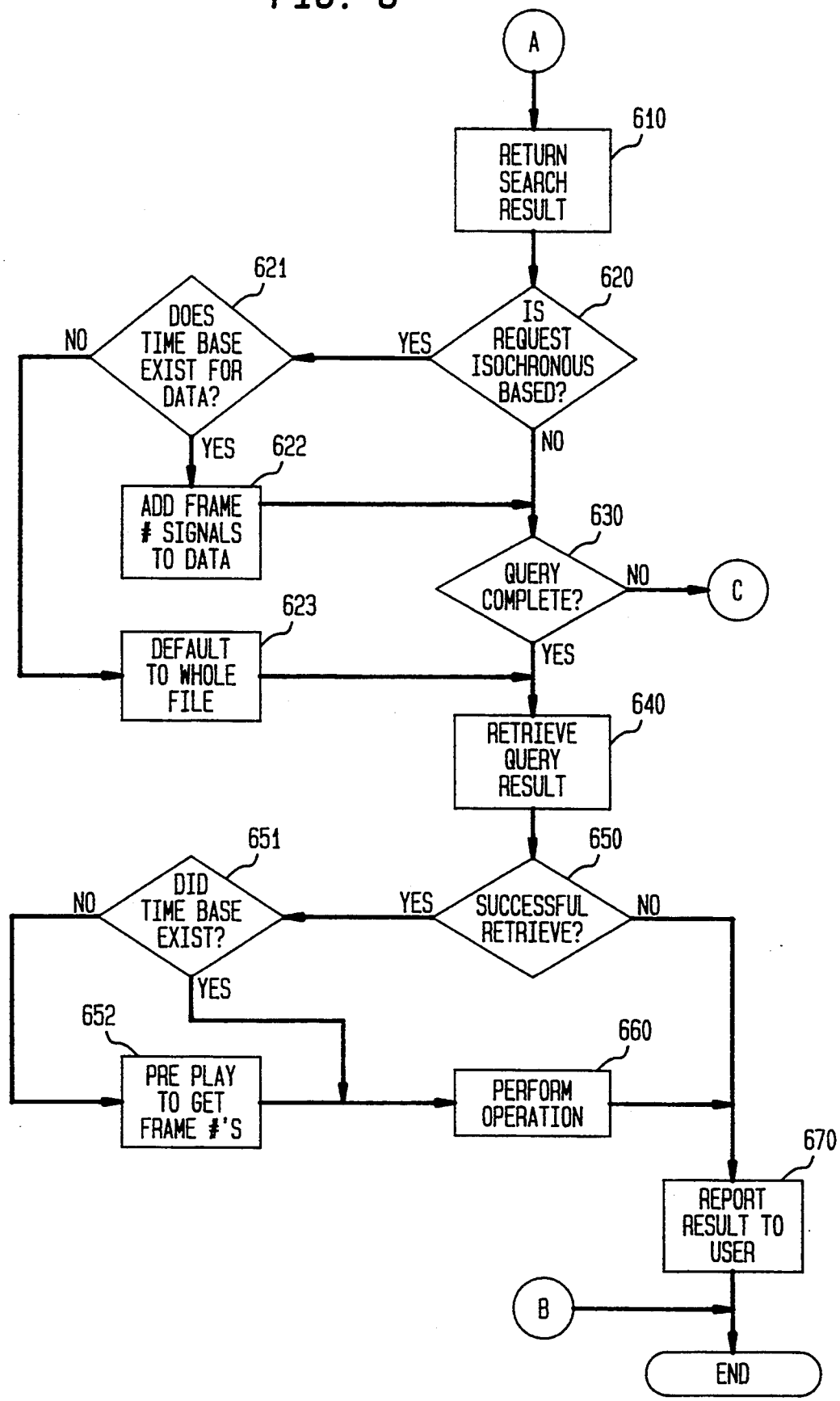

It should be noted that portions of the procedures of both FIG. 5 and FIG. 6 are run as subroutines of each other and are applicable to both the search process and for database queries. Therefore, this methodology is particularly compact for rapid execution by a general purpose data processing system. It is also to be understood that only the playback mode of operation within the terminal 200 must be performed synchronously. All other data transfer and manipulation operations may be executed at extremely high speed, thus providing the operator with the same or greater convenience than the prior manipulation of a storage medium such as film or audio tape. Moreover, the features of the structured language and the object oriented user interface are simple and natural for those having experience in editing audio-visual information by manipulation of such media. The comparative flexibility of the present invention is much increased in comparison with such techniques due to the ease of copying of segments of data and the facility of searching based on the content of the isochronous data.

In view of the foregoing, it is seen that the apparatus and methodology in accordance with the invention allows the user to specify segments of isochronous data and allows them to be manipulated as objects and modified by comparison with other objects on the basis of Boolean or time duration constraints. Data storage and network transmission time requirements are greatly reduced. Further, the invention provides a convenient vehicle for the management and reproduction of isochronous data.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of manipulating isochronous digital data including the steps of
   retrieving an item of isochronous data from a library storage means,
   transmitting at least a portion of said isochronous data to a terminal of a data processing system,
   reproducing at least a frame of said portion of isochronous data utilizing said terminal,
   selecting at least one of said at least a frame of said portion of isochronous data,
   searching said isochronous data for correspondence with said selected frame of said portion of isochronous data,
   retrieving at least one frame of isochronous data responsive to results of said searching step,
   displaying a logical operation using said at least a frame of said portion of isochronous data as an argument, and selectively performing said logical operation.

2. A method as recited in claim 1, including the further step of associating a name with said selected frame of said portion of isochronous data.

3. A method as recited in claim 2, including the further step of searching said isochronous data in accordance with said name associated with said selected frame of said portion of isochronous data.

4. A method as recited in claim 1, including the further step of defining frames within said portion of isochronous data.

5. A method as recited in claim 4, wherein said step of defining frames within said portion of isochronous data includes generating a unique frame identifying signal for embedding within said portion of isochronous data.

6. A method as recited in claim 1, including the further step of associating a unique frame identifying signal with each frame of at least a segment of said item of said isochronous data.

7. A method as recited in claim 1, wherein said step of displaying a logical operation further includes the steps of
   defining a segment of said portion of isochronous data by one of a criterion referenced to said selected frame and a further selection of a frame of said portion of isochronous data,
   performing at least one of a retrieve operation, a copy operation and a delete operation of said segment of said portion of isochronous data.

8. A method as recited in claim 7, wherein said logical operation includes performing a Boolean logic operation in regard to said segment defined by said defining step and another item or portion of an item of isochronous data.

9. A method as recited in claim 1, including the step of inserting a icon corresponding to at least a selected frame in a representation of a data processing command.

10. A method as recited in claim 9, wherein said icon is formed by reproducing a frame of said isochronous data.

11. A method as recited in claim 10, wherein said frame of isochronous data is a frame of video information.

12. A method as recited in claim 11, wherein said step of displaying a logical operation further includes the steps of
    defining a segment of said portion of isochronous data by one of a criterion referenced to said selected frame and a further selection of a frame of said portion of isochronous data, performing at least one of a retrieve operation, a copy operation and a delete operation of said segment of said portion of isochronous data.

13. A method as recited in claim 12, wherein said logical operation includes performing a Boolean logic operation in regard to said segment defined by said defining step and another item or portion of an item of isochronous data.

14. A method as recited in claim 9, wherein said step of displaying a logical operation further includes the steps of defining a segment of said portion of isochronous data by one of a criterion referenced to said selected frame and a further selection of a frame of said portion of isochronous data, performing at least one of a retrieve operation, a copy operation and a delete operation of said segment of said portion of isochronous data.

15. A method as recited in claim 14, wherein said logical operation includes performing a Boolean logic operation in regard to said segment defined by said defining step and another item or portion of an item of isochronous data.

* * * * *